(12) United States Patent
Hur et al.

(10) Patent No.: US 12,095,105 B2
(45) Date of Patent: Sep. 17, 2024

(54) BATTERY PACK INCLUDING COVER STRUCTURE, ELECTRONIC DEVICE AND VEHICLE

(71) Applicant: LG CHEM, LTD., Seoul (KR)

(72) Inventors: Jae-Yong Hur, Daejeon (KR); Jin-Oh Yang, Daejeon (KR); Kwang-Bae Lee, Daejeon (KR); Young-Su Son, Daejeon (KR); Kun-Joo Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 847 days.

(21) Appl. No.: 17/278,204

(22) PCT Filed: Mar. 27, 2020

(86) PCT No.: PCT/KR2020/004248
§ 371 (c)(1),
(2) Date: Mar. 19, 2021

(87) PCT Pub. No.: WO2020/262806
PCT Pub. Date: Dec. 30, 2020

(65) Prior Publication Data
US 2021/0351468 A1 Nov. 11, 2021

(30) Foreign Application Priority Data

Jun. 24, 2019 (KR) .................. 10-2019-0075220
Mar. 10, 2020 (KR) .................. 10-2020-0029667

(51) Int. Cl.
*H01M 50/213* (2021.01)
*H01M 10/48* (2006.01)
(Continued)

(52) U.S. Cl.
CPC ....... *H01M 50/213* (2021.01); *H01M 10/482* (2013.01); *H01M 50/258* (2021.01);
(Continued)

(58) Field of Classification Search
None
See application file for complete search history.

(56) References Cited

U.S. PATENT DOCUMENTS

| 5,304,434 A | 4/1994 | Stone |
| 2007/0178377 A1 | 8/2007 | Kim et al. |

(Continued)

FOREIGN PATENT DOCUMENTS

| CN | 103733376 A | 4/2014 |
| CN | 204118149 U | 1/2015 |

(Continued)

OTHER PUBLICATIONS

International Search Report (with partial translation) and Written Opinion issued in corresponding International Patent Application No. PCT/KR2020/004248, dated Jul. 17, 2020.

(Continued)

*Primary Examiner* — Wyatt P McConnell
(74) *Attorney, Agent, or Firm* — Morgan, Lewis & Bockius LLP

(57) ABSTRACT

A battery pack has reduced manufacturing cost, improved heat dissipation efficiency, and enhanced product stability. The battery pack includes a cover structure including a first cover frame having a plate shape with both front and rear ends bent leftward to form an inner space and a second cover frame having a portion coupled to the first cover frame and having a plate shape with both front and rear ends bent rightward to form an inner space; a first battery module having a plurality of battery cells; and a second battery module having a plurality of battery cells.

17 Claims, 10 Drawing Sheets

(51) Int. Cl.
*H01M 50/258* (2021.01)
*H01M 50/271* (2021.01)
*H01M 50/502* (2021.01)
*H01M 50/572* (2021.01)

(52) U.S. Cl.
CPC ....... *H01M 50/271* (2021.01); *H01M 50/502* (2021.01); *H01M 50/572* (2021.01); *H01M 2220/20* (2013.01)

(56) References Cited

U.S. PATENT DOCUMENTS

| | | |
|---|---|---|
| 2008/0233475 A1 | 9/2008 | Kozu et al. |
| 2012/0177965 A1 | 7/2012 | Lee et al. |
| 2014/0227576 A1 | 8/2014 | Meintschel et al. |
| 2015/0072217 A1 | 3/2015 | Kim et al. |
| 2015/0079451 A1 | 3/2015 | Jeong et al. |
| 2015/0255225 A1 | 9/2015 | Kusaba et al. |
| 2016/0006006 A1 | 1/2016 | Motokawa et al. |
| 2017/0110753 A1 | 4/2017 | Ko et al. |
| 2019/0181405 A1 | 6/2019 | Kim et al. |
| 2019/0267682 A1 | 8/2019 | Seo et al. |

FOREIGN PATENT DOCUMENTS

| | | |
|---|---|---|
| CN | 104466049 A | 3/2015 |
| CN | 104823302 A | 8/2015 |
| CN | 207199697 U | 4/2018 |
| CN | 207199697 * | 6/2018 |
| CN | 207818670 U | 9/2018 |
| CN | 208522013 U | 2/2019 |
| JP | H0689706 A | 3/1994 |
| JP | 2005209365 A | 8/2005 |
| JP | 2005-285456 A | 10/2005 |
| JP | 2014-525132 A | 9/2014 |
| JP | 6083306 B2 | 10/2014 |
| JP | 2015-056399 A | 3/2015 |
| JP | 2015-122323 A | 7/2015 |
| JP | 2016-504731 A | 2/2016 |
| JP | 2016-210207 A | 12/2016 |
| JP | 2018110048 A | 12/2016 |
| KR | 10-1486928 B1 | 2/2015 |
| KR | 10-2016-0049863 A | 5/2016 |
| KR | 10-1720636 B1 | 3/2017 |
| KR | 10-1816355 A | 1/2018 |
| KR | 10-2018-0112617 A | 10/2018 |
| KR | 10-20190069873 A | 6/2019 |
| WO | 2014/083600 A1 | 6/2014 |

OTHER PUBLICATIONS

Communication issued in corresponding European Patent Application No. 20832382.4, dated Oct. 15, 2021.

Office Action issued in corresponding Chinese Patent Application No. 202080004844.7, dated Aug. 3, 2022.

Office Action issued in corresponding Japanese Patent Application No. 2021-507790, dated Mar. 28, 2022. Note: US 2017/0110753 cited therein is already of record.

Second Office Action issued in corresponding Chinese Patent Application No. 202080004844.7, dated Mar. 9, 2023.

* cited by examiner

BATTERY PACK INCLUDING COVER STRUCTURE, ELECTRONIC DEVICE AND VEHICLE

TECHNICAL FIELD

The present disclosure relates to a battery pack including a cover structure, an electronic device and a vehicle, and more particularly, to a battery pack having a reduced manufacture cost, improved heat dissipation efficiency and enhanced product stability, and an electronic device and a vehicle including the battery pack.

The present application claims priority to Korean Patent Application No. 10-2019-0075220 filed on Jun. 24, 2019 in the Republic of Korea, the disclosures of which are incorporated herein by reference.

The present application claims priority to Korean Patent Application No. 10-2020-0029667 filed on Mar. 10, 2020 in the Republic of Korea, the disclosures of which are incorporated herein by reference.

BACKGROUND ART

A secondary battery has high applicability to various product groups and has electrical characteristics with high energy density. The secondary battery is applied not only to portable electronic devices, but also to electric vehicles, hybrid electric vehicles, energy storage systems, and the like, driven by an electric driving source.

The secondary battery is attracting attention as a new energy source for enhancing eco-friendliness and energy efficiency, since by-products are not generated due to the use of energy, along with the primary advantage that the use of fossil fuels may be dramatically reduced.

A battery pack applied to an electric vehicle has a structure in which a plurality of battery modules, each having a plurality of battery cells, are connected to obtain high power. In addition, each battery cell is an electrode assembly including positive and negative electrode current collectors, a separator, active materials, an electrolyte, and the like, and may be repeatedly charged and discharged by electrochemical reactions between the components.

Recently, as a need for a large-capacity structure has been increased along with utilization as an energy storage source, there is an increasing demand for a battery pack having a multi-module structure in which a plurality of battery modules, each having a plurality of secondary batteries connected in series and/or in parallel, are aggregated. At this time, the battery pack could be configured by closely arranging the battery modules such that a large number of secondary batteries may be accommodated in a limited space.

In addition, the conventional battery pack includes a metal plate as a configuration for electrically connecting the plurality of battery modules to each other and also electrically connecting the plurality of cylindrical battery cells provided in each battery module.

However, in order to connect the metal plate mounted on one battery module with another metal plate, it is necessary to provide a separate space for welding the metal plates inside a module housing of the battery module.

Due to the space for welding, the conventional battery module has a limitation in including a larger number of cylindrical battery cells since a dead space is formed in the module housing, thereby greatly lowering the energy density of the battery pack.

Moreover, as a large-capacity battery pack is increasingly demanded in recent years, a need for a mounting structure capable of stably mounting a plurality of battery modules is increasing.

That is, in the prior art, in order to stably protect and fix the battery modules, it is necessary to fix the battery modules using a plurality of fixing members such as bushings or metal rods to the internal structure. Alternatively, it is necessary to provide a large and heavy outer case to ensure mechanical rigidity. Accordingly, the conventional battery pack has a problem of significantly increasing the manufacture cost and time, and the energy density is deteriorated due to the large and heavy fixing member or exterior case.

DISCLOSURE

Technical Problem

The present disclosure is designed to solve the problems of the related art, and therefore the present disclosure is directed to providing a battery pack having a reduced manufacture cost, improved heat dissipation efficiency and enhanced product stability.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising:
  a cover structure including a first cover frame having a plate shape with both front and rear ends bent leftward to form an inner space and a second cover frame having a portion coupled to the first cover frame and having a plate shape with both front and rear ends bent rightward to form an inner space;
  a first battery module accommodated in the inner space of the first cover frame and having a plurality of battery cells; and
  a second battery module accommodated in the inner space of the second cover frame and having a plurality of battery cells.

Moreover, the first cover frame may include a first body portion having a plate shape extending in a vertical direction with respect to the ground and a front and rear direction and configured to cover a right side of the first battery module, and a first bent portion configured to extend leftward from both front and rear ends of the first body portion to cover front and rear outer sides of the first battery module.

In addition, the second cover frame may include a second body portion having a plate shape extending in a vertical direction with respect to the ground and a front and rear direction and coupled to a right side of the first body portion to cover a left side of the second battery module, and a second bent portion configured to extend leftward from both front and rear ends of the second body portion to cover front and rear outer sides of the second battery module.

Further, the first bent portion of the first cover frame may include:
  a first open part opened such that an electric bus bar configured to electrically connect the first battery module to electrical components is exposed to the outside; and a first opening opened such that a part of a module bus bar configured to electrically connect the first battery module and the second battery module is exposed to the outside.

Also, the second bent portion of the second cover frame may include:
a second open part opened such that an electric bus bar configured to electrically connect the second battery module to electrical components is exposed to the outside; and
a second opening opened such that a part of the module bus bar configured to electrically connect the first battery module and the second battery module is exposed to the outside.

Moreover, electrical components configured to detect and measure current of the first battery module and the second battery module or to control a flow of the current may be mounted to outer sides of the first bent portion and the second bent portion.

In addition, the cover structure may include a reinforcing member coupled to an outer side of each of the first bent portion and the second bent portion.

Also, each of the first battery module and the second battery module may further include:
a module housing having a plurality of hollows formed therein such that the plurality of battery cells are inserted and accommodated therein; and
a connection plate including a connection portion having a plate shape with relatively wider upper and lower surfaces than side surfaces, located at an upper or lower portion thereof at which electrode terminals of the plurality of battery cells are formed, and having a plurality of connection terminals to be in electric contact and connection with the electrode terminals of the battery cells, and an extending portion configured to protrusively extend from both left and right ends of the connection portion so that a part of the protrusively extending portion is bent upward or downward from the connection portion and an end of the bent portion is in contact and connection with a portion of another connection plate.

Moreover, the connection plate may have a first connection plate and a second connection plate,
the extending portion of the second connection plate may be in electric contact with the extending portion of the first connection plate, and
the extending portion of each of the first connection plate and the second connection plate may have an expanding structure diagonally extending in a front or rear direction.

In addition, each of the first cover frame and the second cover frame may have a ridged structure configured to face a portion of the module housing.

Further, the cover structure may further include:
an upper plate configured to cover upper portions of the first cover frame and the second cover frame; and
a lower plate configured to support lower portions of the first cover frame and the second cover frame upward.

Also, the module housing may have a fixing tube perforated vertically from an upper portion to a lower portion thereof.

Moreover, the upper plate and the lower plate may include a fixing member having a protrusively extending shape so as to be partially inserted into the fixing tube of the module housing.

In addition, each of the first battery module and the second battery module may further include at least one thermal conductive member at an upper portion thereof, at a lower portion thereof, or at both upper and lower portions thereof.

Further, a barrier may be provided to protrusively extend upward from an upper surface of the module housing, and the thermal conductive member may be disposed to be in contact with a portion of the barrier.

Also, a rib extending in a front and rear direction may be formed at an end of the barrier of each of the first battery module and the second battery module, and
the battery pack may further comprise a fixture configured to be coupled to the rib of each of the first battery module and the second battery module.

Moreover, in another aspect of the present disclosure, there is also provided an electronic device, comprising the battery pack according to the present disclosure.

In addition, in another aspect of the present disclosure, there is also provided a vehicle, comprising the battery pack according to the present disclosure.

Advantageous Effects

According to an embodiment of the present disclosure, the cover structure of the present disclosure is configured such that the first cover frame and the second cover frame separated from each other are coupled to each other. Thus, different from an 'I'-shaped structure in a planar shape formed as an integrated type, the cover structure may be manufactured easily just with a small manufacturing facility, thereby greatly reducing the manufacturing cost.

Moreover, since the cover structure having the first cover frame and the second cover frame bent to cover the front and rear sides of the battery module is provided, it is possible to effectively protect the battery module from external shocks in the front and rear direction of the battery pack. Accordingly, the safety of the battery pack may be effectively increased.

In addition, since the first cover frame and the second cover frame are configured to respectively cover the right side of the first battery module and the left side of the second battery module, the heat accumulated between the first battery module and the second battery module may be effectively discharged to the outside, thereby greatly enhancing the cooling efficiency of the battery pack.

Also, according to this embodiment of the present disclosure, the present disclosure may effectively protect the first battery module and the second battery module from external impact by means of the cover structure including the first cover frame and the second cover frame.

Moreover, according to this embodiment of the present disclosure, since the coupling portion between the connection plates is formed at the left and right sides of the module housing, it may be unnecessary to secure a space in the front and rear direction for the contact connection between the connection plates inside the module housing. Accordingly, it is possible to significantly increase the energy density of the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
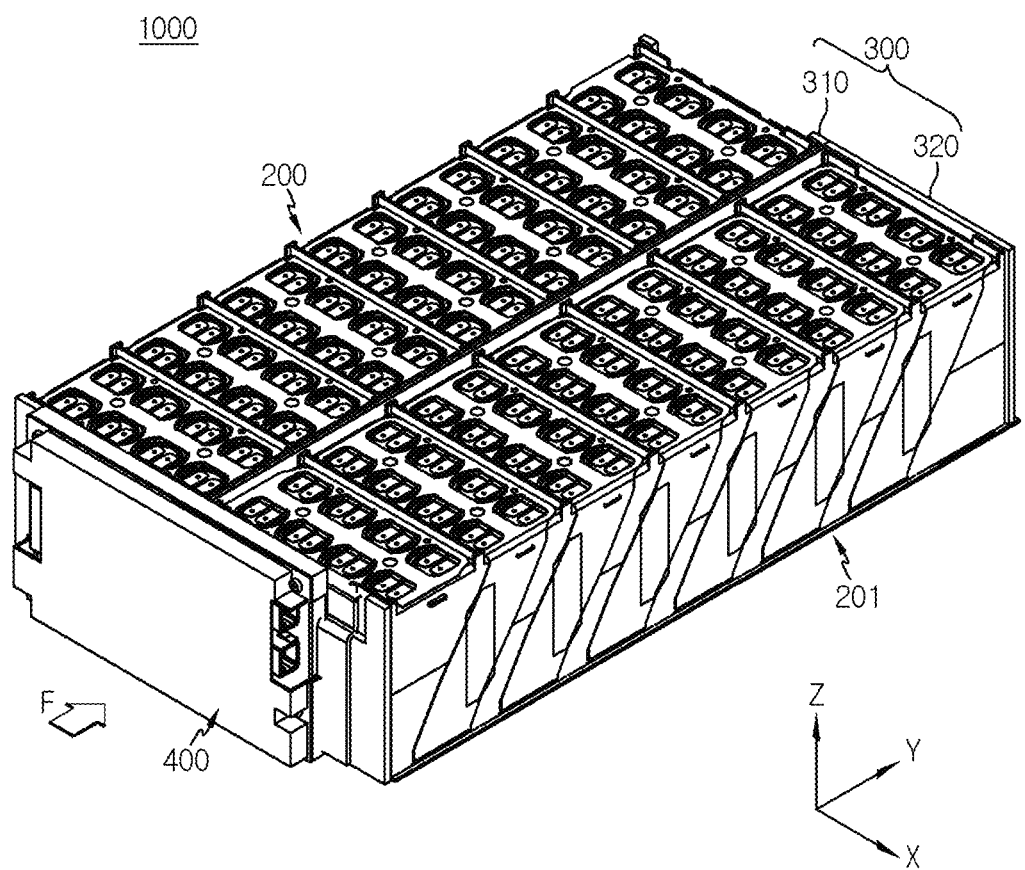
FIG. 1 is a perspective view schematically showing a battery pack according to an embodiment of the present disclosure.
Figure 2:
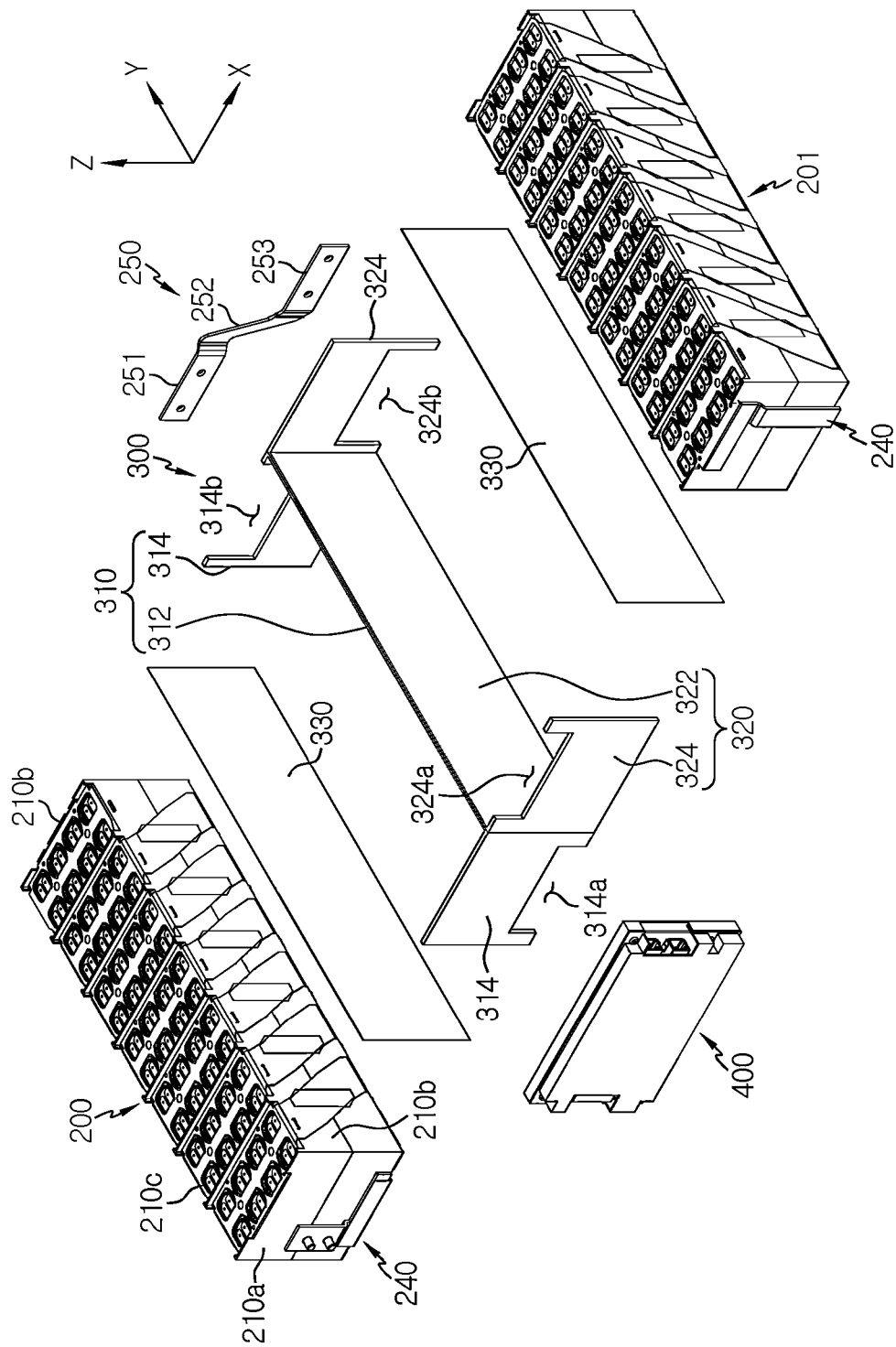
FIG. 2 is an exploded perspective view schematically showing components of the battery pack of FIG. 1.

FIG. 1 is a perspective view schematically showing a battery pack according to an embodiment of the present disclosure. FIG. 2 is an exploded perspective view schematically showing components of the battery pack of FIG. 1. Also, FIG. 3 is an exploded perspective view schematically showing components of a battery module of the battery pack according to an embodiment of the present disclosure.

Figure 3:
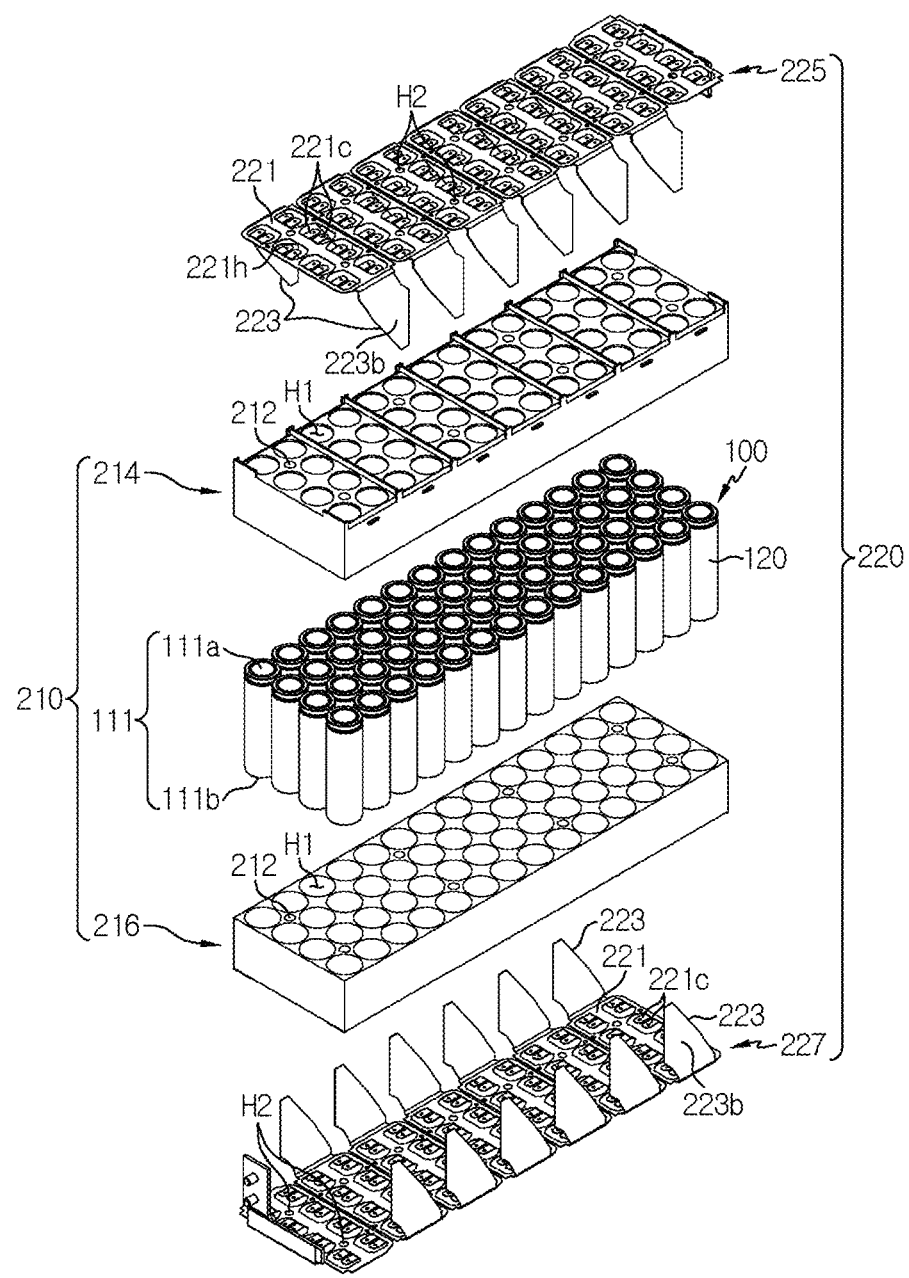
FIG. 3 is an exploded perspective view schematically showing components of a battery module of the battery pack according to an embodiment of the present disclosure.

Referring to FIGS. 1 to 3, a battery pack 1000 according to an embodiment of the present disclosure may include a cover structure 300, a first battery module 200 having a plurality of battery cells 100, and a second battery module 201 having a plurality of battery cells 100.

Here, the battery cell 100 may be a cylindrical battery cell 100. The cylindrical battery cell 100 may include a cylindrical battery can 120 and an electrode assembly (not shown) accommodated inside the battery can 120.

In addition, the cylindrical battery cell 100 may be configured in a form in which the battery can 120 is erected in a vertical direction. Moreover, the battery can 120 includes a material with high electrical conductivity, and, for example, the battery can 120 may include an aluminum alloy or a copper alloy.

In addition, two electrode terminals 111 may be formed at each of upper and lower portions of the battery can 120. Specifically, a positive electrode terminal 111a may be formed at a flat circular top surface of the battery can 120, and a negative electrode terminal 111b may be formed at a flat circular bottom surface of the battery can 120.

Also, an electrical insulating member may be coated on a side portion of the battery can 120.

That is, since the battery can 120 is electrically connected to an electrode of the electrode assembly therein, an insulating film (not shown) or an electrically insulating adhesive surrounding the side portion of the battery can 120 may be coated to prevent an unintentional conductive object from contacting the battery can 120 and causing electrical leakage.

Also, the electrode assembly (not shown) may be formed with a rolled structure in a jelly-roll type in a state where a separator is interposed between a positive electrode having a positive electrode plate coated with a positive electrode active material and a negative electrode having a negative electrode plate coated with a negative electrode active material. Moreover, a positive electrode tab may be attached to the positive electrode (not shown) and connected to the positive electrode terminal 111a at the top of the battery can 120. In addition, a negative electrode tab may be attached to the negative electrode (not shown) and connected to the negative electrode terminal 111b at the bottom of the battery can 120.

Further, when viewed in the F direction, the plurality of cylindrical battery cell 100 may be arranged in a horizontal direction to be erected vertically inside the module housing 210.

For example, as shown in FIG. 3, the first battery module 200 includes 56 cylindrical battery cells 100. In addition, the 56 cylindrical battery cells 100 may be arranged to be adjacent to each other in a horizontal direction in a vertically erected form.

Here, the terms indicating directions such as front, rear, left, right, upper and lower, used in this specification, may vary depending on the position of an observer or the shape of an object. However, in this specification, for convenience of description, the front, rear, left, right, upper and lower directions are distinguished based on the case where viewed in the F direction.

Meanwhile, referring to FIGS. 1 and 2 again, the cover structure 300 may include a first cover frame 310 and a second cover frame 320. Specifically, when viewed in the F direction of FIG. 1, the first cover frame 310 may be configured in a plate shape in which both ends thereof in a front and rear direction (Y-direction) are bent leftward to form an inner space. In addition, the second cover frame 320 may be configured in a plate shape in which a part thereof is coupled to the first cover frame 310 and both front and rear ends thereof are bent rightward to form an inner space.

A right surface of the first body portion 312 of the first cover frame 310 and a left surface of the second body portion 322 of the second cover frame 320 may be positioned to correspond to each other. In addition, the right surface of the first body portion 312 of the first cover frame 310 and the left surface of the second body portion 322 of the second cover frame 320 may be coupled to each other.

Therefore, according to this configuration of the present disclosure, the cover structure 300 of the present disclosure is configured such that the first cover frame 310 and the second cover frame 320 separated from each other are coupled to each other. Thus, different from an 'I'-shaped structure in a planar shape formed as an integrated type, the cover structure 300 may be manufactured easily just with a small manufacturing facility, thereby greatly reducing the manufacturing cost.

Moreover, since the cover structure 300 having the first cover frame 310 and the second cover frame 320 bent to cover the front and rear sides of the battery module is provided, it is possible to effectively protect the battery module from external shocks in the front and rear direction of the battery pack 1000. Accordingly, the safety of the battery pack 1000 may be effectively increased.

For example, as shown in FIG. 2, the first cover frame 310 may include a first body portion 312 and a first bent portion 314. When viewed in the F direction of FIG. 1, the first body portion 312 may have a plate shape extending in a vertical direction with respect to the ground and a front and rear direction to cover a right side of the first battery module 200. Further, the first bent portion 314 may be bent to extend leftward from both front and rear ends of the first body portion 312 to cover front and rear outer sides of the first battery module 200.

The second cover frame 320 may also include a second body portion 322 and a second bent portion 324. When viewed in the F direction of FIG. 1, the second body portion 322 may have a plate shape extending in a vertical direction with respect to the ground and a front and rear direction (Y direction) to cover a left side of the second battery module 201. The second body portion 322 may be coupled to a right part of the first body portion 312 of the first cover frame 310. In addition, the second bent portion 324 may be bent to extend rightward from both front and rear ends of the second body portion 322 to cover front and rear outer sides of the second battery module 201.

For example, as shown in FIG. 2, the first bent portion 314 may be provided at both front and rear ends of the first cover frame 310, and two second bent portions 324 may be provided at both front and rear ends of the second cover frame 320.

Thus, according to this configuration of the present disclosure, since the first cover frame 310 and the second cover frame 320 are configured to respectively cover the right side of the first battery module 200 and the left side of the second battery module 201, the heat may be effectively discharged to the outside of the battery pack 1000 by conducting heat accumulated between the first battery module 200 and the second battery module 201 in the front and rear direction (Y direction) along the first body portion 312 and the second body portion 322 to transfer the heat to the first bent portion 314 and the second bent portion 324, thereby greatly enhancing the cooling efficiency of the battery pack 1000.

Meanwhile, referring to FIGS. 1 to 3 again, the first battery module 200 may be accommodated in the inner space formed by the first body portion 312 and the first bent portion 314 of the first cover frame 310. That is, the first battery module 200 may have a size that may be accommodated in the inner space of the first cover frame 310. For example, as shown in FIG. 2, the first battery module 200 has a length in the front and rear direction as much as a distance between the first bent portions 314 at both ends of the first body portion 312 located in the front and rear direction (Y direction) of the first cover frame 310. In addition, the first battery module 200 may have a height equal to or smaller than the vertical height of the first body portion 312 and the first bent portion 314.

Moreover, the second battery module 201 may be accommodated in the inner space formed by the second body portion 322 and second bent portion 324 of the second cover frame 320. That is, the second battery module 201 may have a size that may be accommodated in the inner space of the second cover frame 320. For example, as shown in FIG. 2, the second battery module 201 may have a length in the front and rear direction as much as a distance between the second bent portions 324 at both ends of the second body portion 322 located in the front and rear direction of the second cover frame 320. In addition, the second battery module 201 may have a height equal to or less than the vertical height of the second body portion 322 and the second bent portion 324.

Accordingly, according to this configuration of the present disclosure, the present disclosure may effectively protect the first battery module 200 and the second battery module 201 from external impact by means of the cover structure 300 including the first cover frame 310 and the second cover frame 320.

In addition, the first cover frame 310 and the second cover frame 320 may be made of steel, aluminum alloy, copper alloy, or stainless steel. The first cover frame 310 and the second cover frame 320 may be coated with an electrically insulating material.

Further, an insulating sheet 330 may be provided between the first cover frame 310 and the first battery module 200 and between the second cover frame 320 and the second battery module 201. The insulating sheet 330 may include, for example, a plastic material or a rubber material with very low electrical conductivity. For example, as shown in FIG. 2, two insulating sheets 330 corresponding to the size of the left and right sides of the first body portion 312 of the first cover frame 310 and the second body portion 322 of the second cover frame 320 may be provided between the first cover frame 310 and the first battery module 200 and between the second cover frame 320 and the second battery module 201.

Therefore, according to this configuration of the present disclosure, since the insulating sheet 330 is provided to the cover structure 300, it is possible to prevent a short circuit between the cover structure 300 and the first battery module 200 or the second battery module 201, or a short circuit of the first battery module 200 and the second battery module 201.

Meanwhile, referring to FIG. 2 again, each of the first battery module 200 and the second battery module 201 may further include an electric bus bar 240 configured to form an electrical connection between the plurality of battery cells 100 and electrical components. The electric bus bar 240 may include an electrically conductive material. For example, the electrically conductive material may be a metal alloy containing copper, nickel, aluminum, gold, silver or the like as a main material.

In addition, the first bent portion 314 of the first cover frame 310 may have a first open part 314a. The first open part 314a may have an open shape such that the electric bus bar 240 configured to make an electrical connection between the first battery module 200 and electrical components is exposed to the outside. For example, as shown in FIG. 2, the first electric bus bar 240 may be provided to a front outer side of the first battery module 200. The first electric bus bar 240 may be electrically connected to the plurality of battery cells 100 of the first battery module 200. In addition, the first electric bus bar 240 may be exposed to the outside through the first open part 314a in an open form. Moreover, a part of the first electric bus bar 240 may have a structure protruding outward through the first open part 314a.

In addition, the second bent portion 324 of the second cover frame 320 may have a second open part 324a. The second open part 324a may have an open form such that the electric bus bar 240 configured to make an electrical connection between the second battery module 201 and electrical components is exposed to the outside. For example, as shown in FIG. 2, the second electric bus bar 240 may be provided to a front outer side of the second battery module 201. The second electric bus bar 240 may be electrically connected to the plurality of battery cells 100 of the second battery module 201. In addition, the second electric bus bar 240 may be exposed to the outside through the second open part 324a in an open form. Moreover, a part of the second electric bus bar 240 may have a structure protruding outward through the second open part 324a.

Thus, according to this configuration of the present disclosure, the first open part 314a and the second open part 324a formed at the first cover frame 310 and the second cover frame 320, respectively, may form a structure capable of connecting the electric bus bar 240 to electrical components in a short length, thereby simplifying the installation of the battery pack 1000, reducing the manufacture cost and improving the space efficiency of the product.

In addition, the battery pack 1000 may further include a module bus bar 250 configured to electrically connect the first battery module 200 and the second battery module 201. The first bent portion 314 of the first cover frame 310 may have a first opening 314b opened so that a portion of the module bus bar 250 protrusively extends outward.

At this time, a part of the module bus bar 250 may have a shape extending into the first opening 314b so as to be electrically connected to the first battery module 200. The other part of the module bus bar 250 may have a shape protrusively extending outward through the first opening 314b. The module bus bar 250 may be made of an electrically conductive material. For example, the electrically conductive material may be a metal alloy containing copper, nickel, aluminum, gold, silver or the like as a main material.

Further, the battery pack 1000 may further include a module bus bar 250 configured to electrically connect the first battery module 200 and the second battery module 201. The second bent portion 324 of the second cover frame 320 may have a second opening 324b opened so that that a portion of the module bus bar 250 protrusively extends to the outside. At this time, a portion of the module bus bar 250 may have a shape extending into the second opening 324b so as to be electrically connected to the second battery module 201. The other part of the module bus bar 250 may have a shape extending outward through the second opening 324b.

For example, as shown in FIG. 2, the module bus bar 250 may include a first terminal portion 251 electrically connected to the plurality of battery cells 100 of the first battery module 200 and a second terminal portion 253 in contact with the second battery module 201. In addition, the module bus bar 250 may include a middle portion 252 connected in a diagonal direction to connect between the first terminal portion 251 and the second terminal portion 253. For example, the first terminal portion 251 and the second terminal portion 253 of the module bus bar 250 may be electrically connected to the first connection plate 225 of the first battery module 200 and the second connection plate 227 of the second battery module 201, respectively.

Therefore, according to this configuration of the present disclosure, since the first cover frame 310 and the second cover frame 320 respectively include the first open part 314a, the second open part 324a, the first opening 314b and the second opening 324b so that the electric bus bar 240 and the module bus bar 250 may be exposed to the outside or protrude to the outside, it is possible to easily make electrical connection between the first battery module 200 and the second battery module 201 of the battery pack 1000 and electrical connection of the first battery module 200 and second battery module 201 to electrical components, thereby increasing the manufacturing efficiency.

Meanwhile, referring to FIGS. 1 and 2 again, electrical components may be mounted to outer sides of the first bent portion 314 and the second bent portion 324. Here, the electrical components may be configured to detect and measure current of the first battery module 200 and the second battery module 201, or to control the flow of the current. Moreover, the first bent portion 314 and the second bent portion 324 may include a metal material capable of blocking electromagnetic waves or magnetic fields.

For example, the battery pack 1000 may include several electrical components (not shown). In addition, these electrical components are also called electrical equipment. Further, a typical example of the electrical equipment included in the battery pack 1000 may be a relay, a current sensor, or a fuse. In addition, a battery management system (BMS) 400 may include such electrical equipment. The electrical equipment is a component for managing charging and discharging of the plurality of battery cells 100 included in the battery pack 1000 and securing safety, and may be a component essentially included in most battery packs 1000.

For example, as shown in FIG. 1, in the battery pack 1000, the BMS 400 having electrical components may be provided on front outer sides of the first bent portion 314 and second bent portion 324.

Therefore, according to this configuration of the present disclosure, since the electrical components are mounted to the outer sides of the first bent portion 314 and the second bent portion 324, the electrical components may avoid the influence of electromagnetic waves or magnetic fields generated from the first battery module 200 and the second battery module 201, thereby preventing erroneous function or signal noise.

Figure 4:
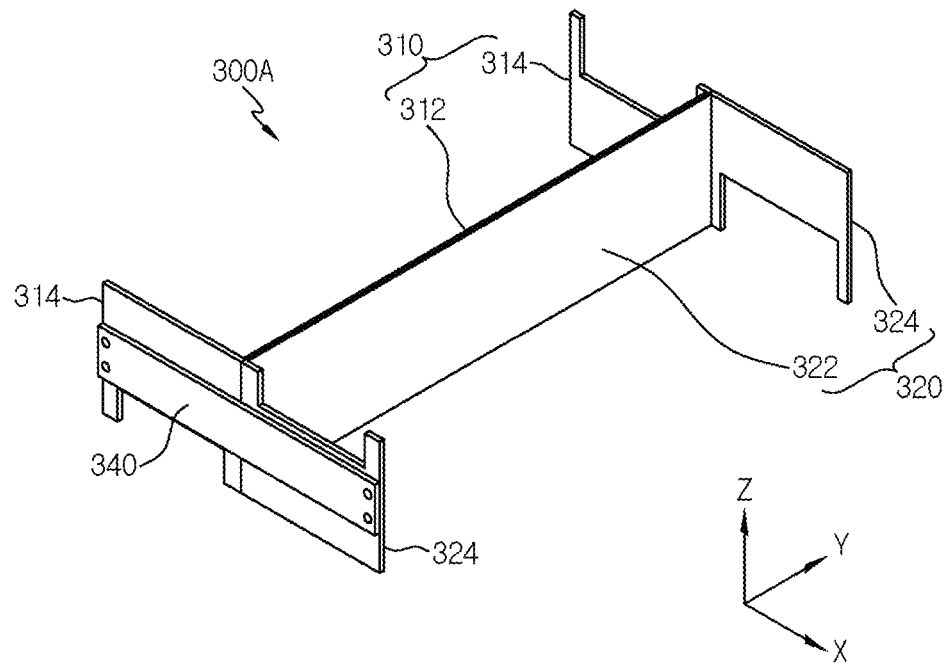
FIG. 4 is a perspective view schematically showing a cover structure serving as a component of a battery pack according to another embodiment of the present disclosure.

FIG. 4 is a perspective view schematically showing a cover structure serving as a component of a battery pack according to another embodiment of the present disclosure.

Referring to FIG. 4 along with FIG. 2, a cover structure 300A according to another embodiment may further include a reinforcing member 340 coupled to the outer side of each of the first bent portion 314 and second bent portion 324. The reinforcing member 340 may be sized to have a length in the left and right direction (X direction) that corresponds to the entire length of the first bent portion 314 and the second bent portion 324 in the left and right direction. In addition, both left and right ends of the reinforcing member 340 may be coupled to the first bent portion 314 and the second bent portion 324.

If an impact is applied to the first bent portion 314 and the second bent portion 324 from the outside, the reinforcing member 340 may be configured to absorb the external impact. Alternatively, the reinforcing member 340 may serve to prevent that the first bent portion 314 and the second bent portion 324 are respectively bent due to external impact toward the first battery module 200 and the second battery module 201 located in the inner space.

For example, as shown in FIG. 4, since the cover structure 300A includes the reinforcing member 340 coupled to the outer side of each of the first bent portion 314 and second bent portion 324, it is possible to effectively increase the mechanical stiffness of the first cover frame 310 and the second cover frame 320. Accordingly, the stability of the battery pack 1000 may be effectively increased.

Referring to FIGS. 2 and 3 again, each of the first battery module 200 and the second battery module 201 may include a module housing 210 and a connection plate 220.

Specifically, the module housing 210 may have an inner space formed therein to accommodate the plurality of cylindrical battery cells 100. A plurality of hollows H1 may be formed in the module housing 210 such that the plurality of battery cells 100 are inserted and accommodated therein. The plurality of hollows H1 may have an inner space formed to cover the outer surface of the cylindrical battery cells 100.

Further, the module housing 210 may include outer walls 210a, 210b, 210c, 210d. For example, as shown in FIG. 2, the module housing 210 may include the outer walls 210a, 210b, 210c, 210d located in front, rear, left and right directions, respectively. In addition, the module housing 210 may include an electrically insulating material. For example, the module housing 210 may include polyvinyl chloride.

In addition, the module housing 210 may include an upper case 214 and a lower case 216.

Here, the upper case 214 may have a hollow H1 formed to surround the outer surface of the upper portion of the cylindrical battery cell 100. Moreover, the lower case 216 is fastened to a lower portion of the upper case 214 and may have a hollow H1 formed to surround the outer surface of the lower portion of the cylindrical battery cell 100. For example, as shown in FIG. 3, 56 hollows H1 may be formed in the upper case 214 and the lower case 216, respectively.

Moreover, the module housing 210 may include a fixing tube 212 perforated in the vertical direction (Z direction) from an upper portion to a lower portion thereof. Specifically, the fixing tube 212 may be located to left and right outer sides, respectively. For example, as shown in FIG. 3, the fixing tube 212 may be positioned to be biased left or right with respect to the center of the module housing 210. The fixing tube 212 may be configured such that a long bolt or a press-in nut (or, a PEM nut) is inserted therein. That is, the module housing 210 may be provided for coupling with an outer structure or the fixing member 352.

Further, the connection plate 220 may include an electrically conductive material. For example, the electrically conductive material may be a metal alloy containing copper, nickel, aluminum, gold, and silver as a main material.

For example, as shown in FIG. 3, in the first battery module 200, 14 connection plates 220 may be located at the upper and lower portions of the plurality of cylindrical battery cell 100, respectively.

In addition, the connection plate 220 may include a connection portion 221 and an extending portion 223. Specifically, the connection portion 221 may have a plate shape with wider upper and lower surfaces than side surfaces. The connection portion 221 may be located at an upper or lower portion at which the positive electrode terminals 111a and the negative electrode terminals 111b of the plurality of cylindrical battery cells 100 are formed. That is, the connection portion 221 may be mounted to the upper or lower portion of the module housing 210.

Further, a plurality of connection terminals 221c to be in electrical contact and connection with the electrode terminals 111 of the plurality of cylindrical battery cell 100 may be provided to a part of the connection portion 221. Specifically, at least one connection opening 221h perforated vertically may be formed at the connection portion 221. In addition, the connection terminal 221c of the connection plate 220 may be formed to protrusively extend in the horizontal direction from an inner side of the rim of the connection opening 221h so as to be in electrical contact and connection with the electrode terminals 111 formed at the plurality of cylindrical battery cells 100. Moreover, the protrusively extending end of the connection terminal 221c may have a branched structure that is split into two sides based on the protrusively extending direction.

Meanwhile, the extending portion 223 may be formed to protrusively extend in the left or right direction from the connection portion 221. In addition, the extending portion 223 may have a shape in which a portion of the protrusively extending portion is bent upward or downward from the connection portion 221. Also, the bent end of the extending portion 223 may be in contact and connection with a portion of another connection plate 220.

For example, as shown in FIG. 3, two extending portions 223 bent to extend downward from the left and right ends of the connection portion 221 may be provided to the connection plate 220 mounted to the upper portion of the module housing 210. In addition, the bent end of the extending portion 223 may be in contact and connection with a portion (an extending portion) of another connecting plate 220.

More specifically, the connection plate 220 may include a first connection plate 225 and a second connection plate 227.

Also, in the first connection plate 225, the connection portion 221 may be located at the upper portion of the plurality of cylindrical battery cells 100. In addition, the extending portion 223 protrusively extending from the connection portion 221 may be bent downward. Moreover, the first connection plate 225 may be electrically connected (joined) to the electrode terminal 111 located at the upper portion of the plurality of cylindrical battery cells 100.

Moreover, the extending portion 223 of the first connection plate 225 may be in electrical contact (join) with the extending portion 223 of the second connection plate 227. In addition, the connection terminal 221c of the first connection plate 225 may be joined to the positive electrode terminal 111a of the plurality of cylindrical battery cells 100 through resistance welding.

In addition, the second connection plate 227 may have a shape in which the connection portion 221 is located at the lower portion of the plurality of cylindrical battery cells 100 and the extending portion 223 protrusively extending from the connection portion 221 is bent upward.

For example, the second connection plate 227 may be electrically connected (contacted) to the electrode terminal 111 located at the lower portion of the plurality of cylindrical battery cells 100. Moreover, the extending portion 223 of the second connection plate 227 may be in electrical contact with the extending portion 223 of the first connection plate 225. Also, the connection terminal 221c of the second connection plate 227 may be joined to the negative electrode terminal 111b of the plurality of cylindrical battery cells 100 through resistance welding.

In addition, the extending portion 223 of each of the first connection plate 225 and the second connection plate 227 may have an expanding structure 223b diagonally extending forward or backward. For example, as shown in FIG. 3, the extending portions 223 of seven first connection plates 225 may have an expanding structure 223b diagonally extending rearward. The extending portions 223 of seven second connection plates 227 may have an expanding structure 223b diagonally extending forward.

Thus, according to this configuration of the present disclosure, since the present disclosure includes the connection plate 220 having the connection portion 221 mounted to the upper or lower portion of the module housing 210 and the extending portion 223 extending in the left and right direction of the connection portion 221 and bent in the upper or lower direction, unlike the conventional battery pack 1000, the contact connection between the connection plates 225, 227 may be made at the left and right outer sides of the module housing 210.

Accordingly, when compared with the prior art, since the coupling portion between the connection plates 220 is formed at the left and right sides of the module housing 210, it may be unnecessary to secure a space in the front and rear direction for the contact connection between the connection plates 225, 227 inside the module housing 210. Accordingly, the first battery module 200 and the second battery module 201 may be designed in a slimmer shape in the front and rear direction. Ultimately, it is possible to significantly increase the energy density of the battery pack 1000.

In addition, referring to FIG. 3, a guide hole H2 drilled in the vertical direction may be formed in the connection portion 221 to communicate with the fixing tube 212. For example, as shown in FIG. 3, two guide holes H2 may be formed in the connection portion 221 of each of the first connection plate 225 and second connection plate 227. Accordingly, when manufacturing the battery pack 1000, the process of mounting the connection plate 220 to the module housing 210 may be performed quickly and easily, thereby improving manufacturing efficiency.

Figure 5:
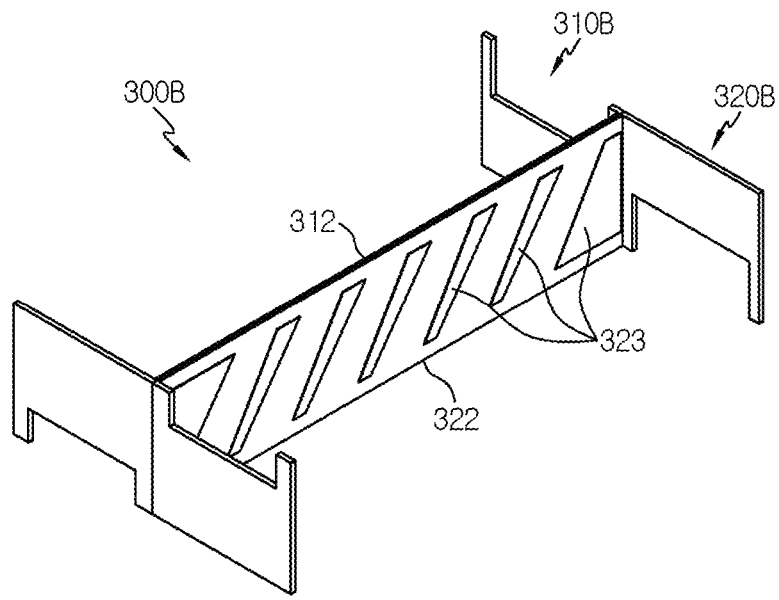
FIG. 5 is a perspective view schematically showing a cover structure serving as a component of a battery pack according to still another embodiment of the present disclosure.

FIG. 5 is a perspective view schematically showing a cover structure serving as a component of a battery pack according to still another embodiment of the present disclosure.

Referring to FIG. 5 along with FIG. 2, each of the first cover frame 310B and the second cover frame 320B of the cover structure 300B according to another embodiment may have a ridged structure (not shown) configured to face a portion of the module housing 210. For example, a plurality of ridged structures configured to face a portion of the module housing 210 may be provided at a left outer surface of the first body portion 312 of the first cover frame 310B. That is, the ridged structure of the first cover frame 310B may be formed at a position not facing the extending portion 223 of the connection plate 220. In addition, the ridged structure of the first cover frame 310B may press the insulating sheet 330 so that the insulating sheet 330 comes into close contact with the outer wall 210b of the module housing 210.

In addition, a plurality of ridged structures 323 configured to face a portion of the module housing 210 may be provided at a right outer surface of the second body portion 322 of the second cover frame 320B. That is, the ridged structure 323 may be formed at a position that does not face the extending portion 223 of the connection plate 220. This is to prevent the ridged structure 323 from colliding with the extending portion 223 of the connection plate 220 to cause destruction or electrical short circuit.

In addition, the ridged structure 323 of the second cover frame 320B may press the insulating sheet 330 so that the insulating sheet 330 comes into close contact with the outer wall 210b of the module housing 210.

Thus, according to this configuration of the present disclosure, since the ridged structure 323 is provided to each of the first cover frame 310B and the second cover frame 320B, the contact area between the cover structure 300 and the first battery module 200 and between the cover structure 300 and the second battery module 201 may be increased, thereby effectively conducting the heat generated from each of the first battery module 200 and the second battery module 201. Accordingly, the heat dissipation efficiency of the battery pack may be greatly increased.

Figure 6:
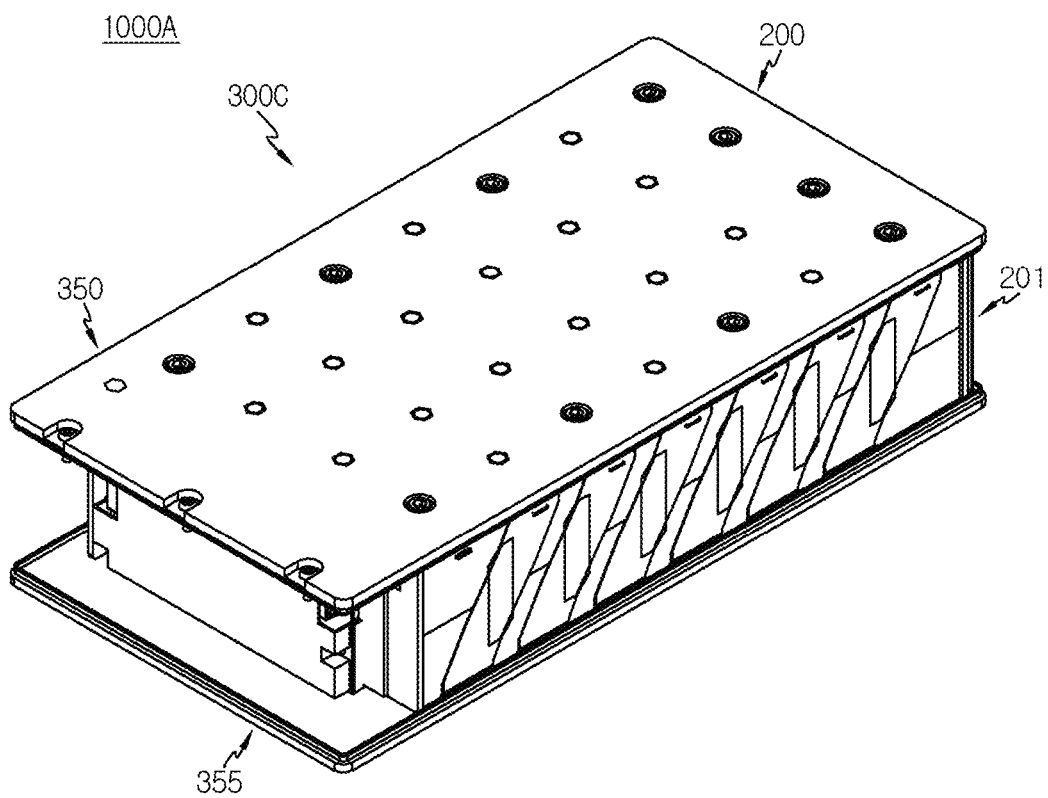
FIG. 6 is a perspective view schematically showing a battery pack according to another embodiment of the present disclosure.

FIG. 6 is a perspective view schematically showing a battery pack according to another embodiment of the present disclosure. Also, FIG. 7 is a perspective view schematically showing components of the battery pack of FIG. 6.

Figure 7:
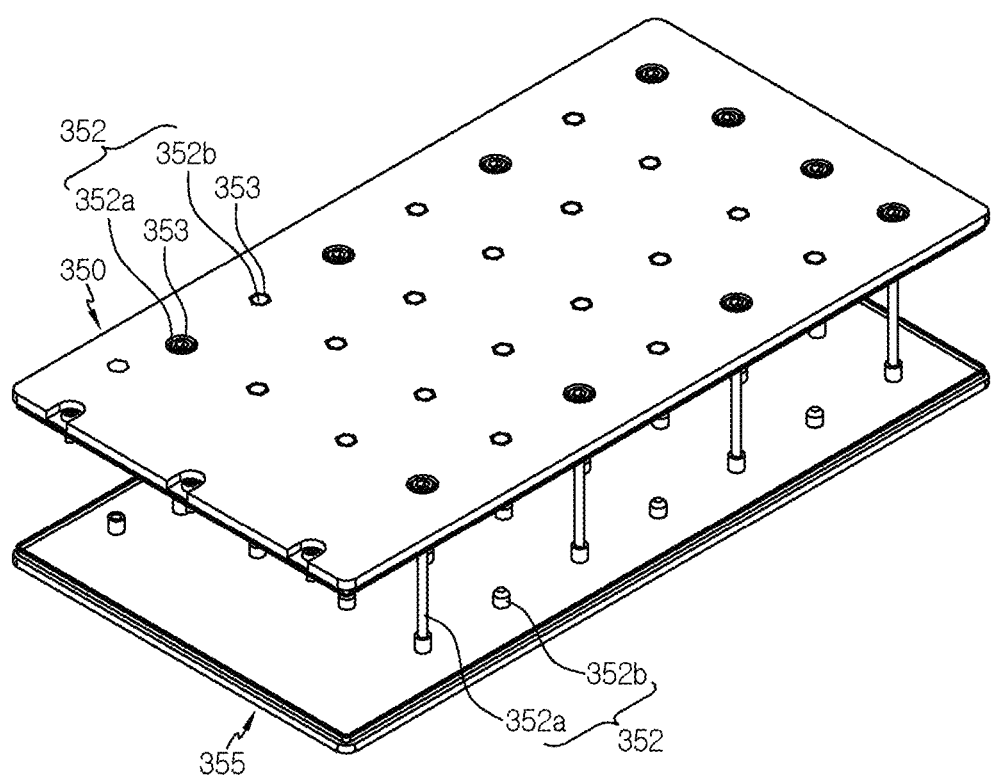
FIG. 7 is a perspective view schematically showing components of the battery pack of FIG. 6.

Referring to FIGS. 6 and 7 along with FIG. 2, the cover structure 300C of the battery pack 1000A according to another embodiment of the present disclosure may further include an upper plate 350 and a lower plate 355. Specifically, the upper plate 350 may be configured to cover upper portions of the first cover frame 310 and the second cover frame 320. The lower plate 355 may be configured to support lower portions of the first cover frame 310 and the second cover frame 320 upward.

For example, as shown in FIG. 6, the upper plate 350 and the lower plate 355 may have a plate shape extending in a horizontal direction. Each of the upper plate 350 and the lower plate 355 may have a size larger than a horizontal plane size of the first battery module 200 and the second battery module 201 so as to cover the first cover frame 310 and the second cover frame 320. That is, the upper plate 350 and the lower plate 355 may have an outer peripheral portion protruding in the horizontal direction further to the first cover frame 310 and the second cover frame 320.

Here, the horizontal direction may refer to a direction parallel to the ground when the upper plate 350 and the lower plate 355 are placed on the ground, and may also be referred to as at least one direction on a plane perpendicular to the upper and lower direction.

Thus, according to this configuration of the present disclosure, since the cover structure 300C further includes the upper plate 350 and the lower plate 355, the heat accumulated in the first cover frame 310, the second cover frame 320, the first battery module 200 and the second battery module 201 may be conducted to the outside through the upper plate 350 and the lower plate 355. Accordingly, the heat dissipation effect of the battery pack 1000A may be effectively increased.

Meanwhile, referring to FIGS. 3 and 7 again, the upper plate 350 and the lower plate 355 may include a fixing member 352 having a protrusively extending shape so as to be partially inserted into the fixing tube 212 of the module housing 210. The upper plate 350 and the lower plate 355 may have a fixing hole 353 into which a portion of the fixing member 352 may be inserted and fixed. For example, the fixing member 352 may include a press-in nut (or, a PEM nut) 352b. The press-in nut 352b may be configured to be inserted into and fixed in the fixing hole 353.

In addition, the press-in nut 352b may be configured to be inserted into the fixing tube 212 of the module housing 210. For example, as shown in FIG. 7, a plurality of press-in nuts 352b may be provided to the upper surface of the lower plate 355. The press-in nut 352b may have a structure protruding upward. That is, the press-in nut 352b inserted into the fixing hole 353 may have a horn shape that is sharp upward.

Moreover, a plurality of the press-in nuts 352b may be provided to the lower surface of the upper plate 350. The press-in nut 352b may have a structure protruding downward. That is, the press-in nut 352b inserted into the fixing hole 353 may have a horn shape that is sharp downward.

In addition, the fixing member 352 may further include a long bolt 352a. The long bolt 352a may be configured to be coupled to each of the upper plate 350 and the lower plate 355. For example, as shown in FIG. 7, a plurality of long bolts 352a are provided. Upper and lower ends of each of the plurality of long bolts 352a may be inserted into the fixing hole 353 so as to be coupled to the upper plate 350 and the lower plate 355, respectively.

Therefore, according to this configuration of the present disclosure, since the fixing members 352 configured to fix the first battery module 200 and the second battery module 201 are provided to the upper plate 350 and the lower plate 355, respectively, the first battery module 200 and the second battery module 201 may be fixed to the upper plate 350 and the lower plate 355 not to move.

Therefore, according to this configuration of the present disclosure, since the press-in nut (PEM nut) 352b is provided as the fixing member 352, the first battery module 200 and the second battery module 201 may be mounted and fixed to the lower plate 355 simultaneously. Alternatively, when the upper plate 350 is mounted to the first battery module 200 and the second battery module 201, the upper plate 350 may be fixed immediately. Accordingly, it is possible to shorten the manufacturing time of the battery pack 1000, prevent a large material cost and effective reduce the weight of the battery pack 1000.

Figure 8:
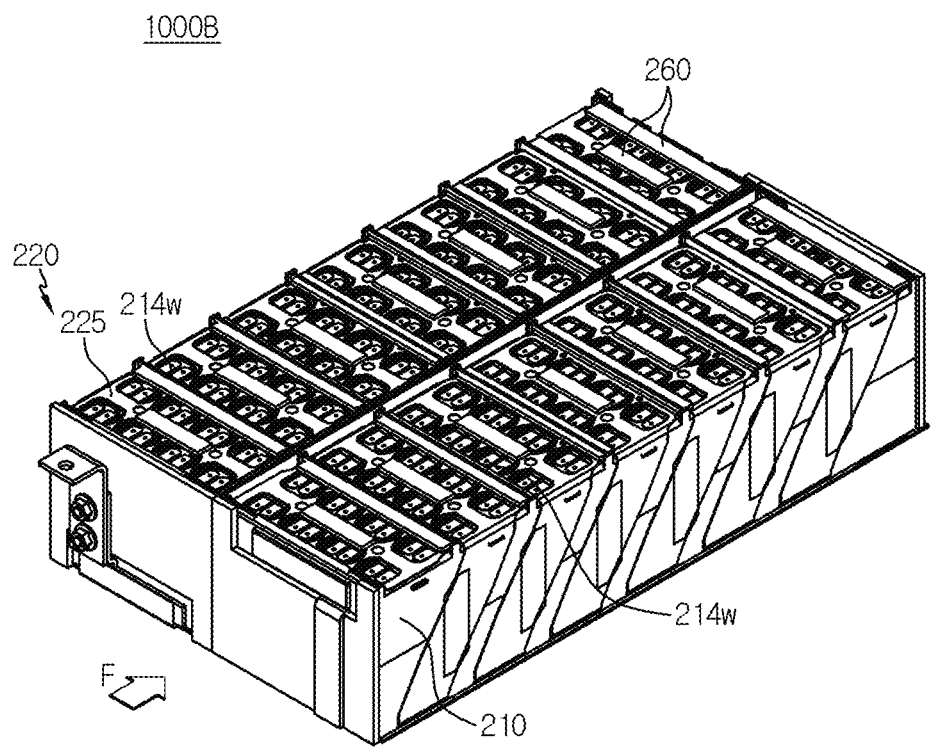
FIG. 8 is a perspective view schematically showing components of a battery pack according to still another embodiment of the present disclosure.

FIG. 8 is a perspective view schematically showing components of a battery pack according to still another embodiment of the present disclosure.

Referring to FIG. 8 along with FIG. 2, at least one thermal conductive member 260 is further provided to an upper portion, a lower portion, or upper and lower portions of each of the first battery module 200 and the second battery module 201 of the battery pack 1000B according to another embodiment. Here, the thermal conductive member 260 may have a pad shape. Specifically, the thermal conductive member 260 may include a polymer resin or a silicone resin and a metal filler with high thermal conductivity. For example, the polymer resin may be a polysiloxane resin, a polyamide resin, a urethane resin, or an epoxy resin. In addition, the thermal conductive member 260 may have a form in which an added adhesive material is solidified. For example, the adhesive material may be a material such as acryl-based, polyester-based, polyurethane-based or rubber-based materials.

In addition, the thermal conductive member 260 may be configured to contact the outer surface of the connection plate 220. For example, as shown in FIG. 8, 14 thermal conductive members 260 may be configured to contact the outer surfaces of the first connection plates 225 of the first battery module 200. In addition, the remaining 14 thermal conductive members 260 may be configured to contact the outer surfaces of the first connection plates 225 of the second battery module 201.

The thermal conductive member 260 may also be configured to contact the outer surface of the module housing 210. More specifically, when viewed in the F direction, a barrier 214w extending upward from the upper surface of the module housing 210 direction may be provided. In addition, the barrier 214w may have a shape extending in the left and right direction from a left end to a right end of the module housing 210.

For example, as shown in FIG. 8, eight barriers 214w may be provided to be spaced apart at regular intervals at the upper portion of each of the first battery module 200 and the second battery module 201.

Furthermore, the thermal conductive member 260 may be disposed to contact a portion of the barrier 214w. That is, the thermal conductive member 260 may be disposed to contact one surface or both surfaces of the barrier 214w in the front and rear direction. For example, in each of the first battery module 200 and the second battery module 201, seven thermal conductive members 260 may be disposed to contact both front and rear sides of the barrier 214w.

Therefore, according to this configuration of the present disclosure, since the thermal conductive member 260 is configured to contact the barrier 214w of the module housing 210, the heat accumulated in the module housing 210 may be rapidly conducted to the outside through the thermal conductive member 260, thereby increasing the cooling efficiency of the battery pack 1000.

Figure 9:
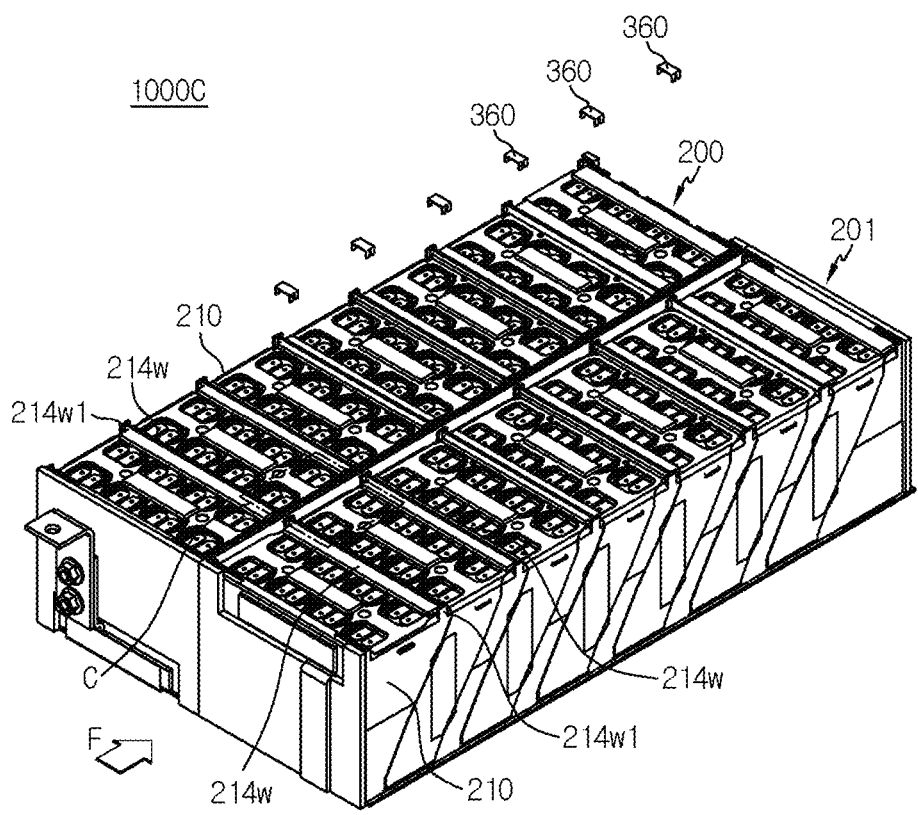
FIG. 9 is an exploded perspective view schematically showing components of a battery pack according to still another embodiment of the present disclosure.
Figure 10:
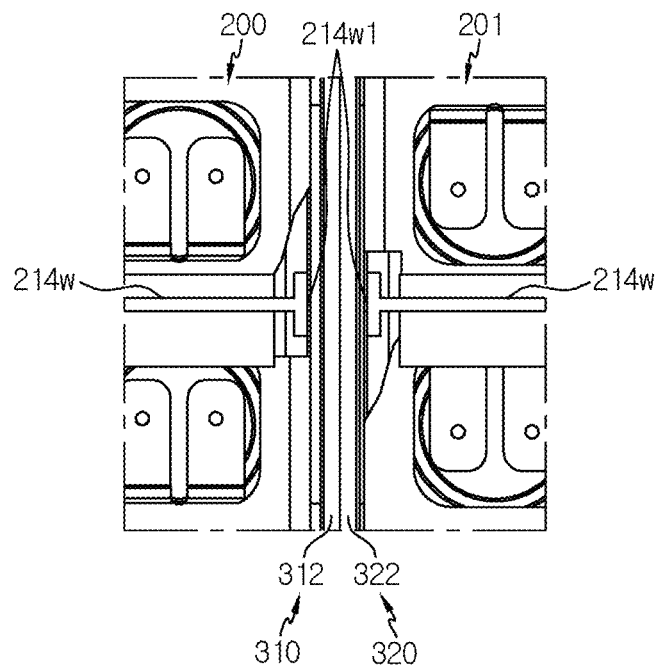
FIG. 10 is a partial plan view schematically showing a portion C of FIG. 9 in an enlarged form.
Figure 11:
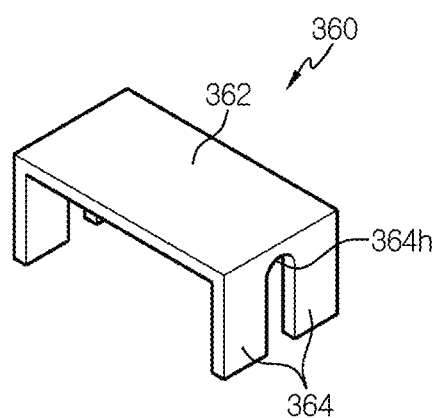
FIG. 11 is a perspective view schematically showing a fixture of the battery pack according to still another embodiment of the present disclosure.
Figure 12:
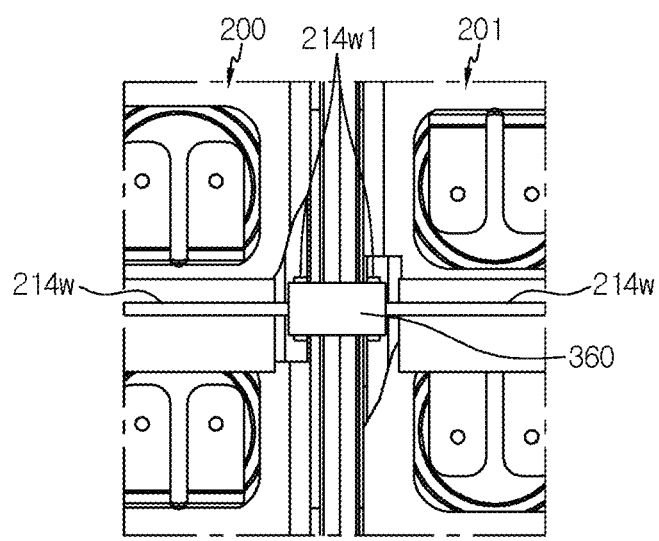
FIG. 12 is a partial plan view schematically showing the battery pack according to still another embodiment of the present disclosure, in which the fixture is coupled to a first battery module and a second battery module.

FIG. 9 is an exploded perspective view schematically showing components of a battery pack according to still another embodiment of the present disclosure. FIG. 10 is a partial plan view schematically showing a portion C of FIG. 9 in an enlarged form. FIG. 11 is a perspective view schematically showing a fixture of the battery pack according to still another embodiment of the present disclosure. Also, FIG. 12 is a partial plan view schematically showing the battery pack according to still another embodiment of the present disclosure, in which the fixture is coupled to a first battery module and a second battery module.

Referring to FIGS. 9 to 12 along with FIG. 2, the battery pack 1000C according to still another embodiment of the present disclosure may further include six fixtures 360, unlike the battery pack 1000B of FIG. 8.

Specifically, ribs 214w1 may be formed at both ends of the barrier 214w provided to the first battery module 200 and the second battery module 201, respectively. The rib 214w1 formed at an inner end (a central direction) of the barrier is 214w may be located to face the first cover frame 310 of the first body portion 312 or the second cover frame 320 of the second body portion 322. The rib 214w1 may have a shape extending in the front and rear direction from the end of the barrier 214w.

For example, as shown in FIG. 10, when viewed in the F direction, the barrier 214w extending in the left and right direction may be provided to the upper portion of the module housing 210 of the first battery module 200. The ribs 214w1 extending in the front and rear direction may be formed at both left and right ends of the barrier 214w, respectively. The rib 214w1 formed at the right end of the barrier 214w of the first battery module 200 may face the first body portion 312 of the first cover frame 310.

In addition, when viewed in the F direction, the module housing 210 of the second battery module 201 may include the barrier 214w extending in the left and right direction. The ribs 214w1 extending in the front and rear direction may be formed at both left and right ends of the barrier 214w of the second battery module 201, respectively. The rib 214w1 formed at the left end of the barrier 214w may face the second body portion 322 of the second cover frame 320.

Moreover, the fixture 360 may be configured to be coupled to the rib 214w1 of each of the first battery module 200 and the second battery module 201. More specifically, the fixture 360 may include a plate-shaped portion 362 extending in a horizontal direction and a fixing portion 364 bent to extend downward from both left and right ends of the plate-shaped portion 362. A fitting groove 364h configured such that an upper portion of the barrier 214w is inserted therein may be formed at the fixing portion 364. That is, the fitting groove 364h may be shaped to be indented upward from the lower end of the fixing portion 364.

For example, as shown in FIG. 12, the fixture 360 may be coupled to the rib 214w1 of the barrier 214w formed at the module housing 210 of the first battery module 200 and the rib 214w1 of the barrier 214w formed at the module housing 210 of the second battery module 201, respectively. At this time, the fixing portions 364 provided at both left and right ends of the fixture 360 may be positioned to face the left surface of the rib 214w1 of the first battery module 200 and the right surface of the rib 214w1 of the second battery module 201, respectively. Also, the fitting groove 364h formed at each of the fixing portions 264 provided to both ends may be fitted into an upper end of the barrier 214w of the first battery module 200 and the second battery module 201, respectively.

Therefore, according to this configuration of the present disclosure, since the rib 214w1 extending in the front and rear direction is formed at the end of the barrier 214w of each of the first battery module 200 and the second battery module 201 and the battery pack 1000C further includes the fixture 360 configured to be coupled to the rib 214w1 of each of the first battery module 200 and the second battery module 201, it is possible to prevent the first battery module 200 and the second battery module 201 from moving in the left and right direction. Accordingly, it is possible to prevent the internal components of the battery pack 1000C from colliding with each other due to vibration or external impact of the battery pack 1000C. In addition, since the fixture 360 may allow the first battery module 200 and the second battery module 201 to make close contact with the first body portion 312 of the first cover frame 310 and the second body portion 322 of the second cover frame 320, respectively, the efficiency of conducting the heat generated in each of the first battery module 200 and the second battery module 201 to the first cover frame 310 and the second cover frame 320 may be enhanced.

In addition, an electronic device according to the present disclosure may include the battery pack 1000. Moreover, the electronic device (not shown) may include a case (not shown) that accommodates the battery pack 1000 therein.

Moreover, a vehicle (not shown) according to the present disclosure may include the battery pack 1000. Moreover, the vehicle may be, for example, an electric vehicle having an electric motor (not shown) powered by the battery pack 1000.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

1000: battery pack
300: cover structure
312, 322: first body portion, second body portion
314, 324: first bent portion, second bent portion
100: battery cell
310, 320: first cover frame, second cover frame
314a, 324a: first open part, second open part
314b, 324b: first opening, second opening
200, 201: first battery module, second battery module
111, 111a, 111b: electrode terminal, positive electrode terminal, negative electrode terminal
220, 225, 227: connection plate, first connection plate, second connection plate
221: connection portion
223b: expanding structure
210: module housing
214: upper case
251: first terminal portion
212: fixing tube
240: electric bus bar
400: BMS
260: thermal conductive member
350, 355: upper plate, lower plate
214w: barrier
360: fixture
364h: fitting groove
223: extending portion
H2: guide hole
210a, 210b, 210c, 210d: outer wall
216: lower case
253: second terminal portion
H1: hollow
250: module bus bar
340: reinforcing member
323: ridged structure
352: fixing member
362, 364: plate-shaped portion, fixing portion

INDUSTRIAL APPLICABILITY

The present disclosure relates to a battery pack including a plurality of battery modules. Also, the present disclosure may be used for industries related to electronic devices and vehicles including the battery pack.

What is claimed is:

1. A battery pack, comprising:
a cover structure including:
a first cover frame having a first body portion with a first plate shape, and first bent portions bent leftward at both front and rear ends of the first body portion to form an inner space of the first cover frame, and
a second cover frame having a second body portion coupled to the first body portion and having a second plate shape, and second bent portions bent rightward at both front and rear ends of the second body portion to form an inner space of the second cover frame;
a first battery module accommodated in the inner space of the first cover frame and having a plurality of battery cells;
a second battery module accommodated in the inner space of the second cover frame and having a plurality of battery cells,
wherein the first body portion extends in a vertical direction and a front-to-rear direction, and the first body portion is configured to cover a right side of the first battery module,
wherein the first bent portions are configured to cover front and rear outer sides of the first battery module,
wherein the second body portion extends in the vertical direction and the front-to-rear direction, and the second body portion is configured to cover a left side of the second battery module,
wherein the second bent portions are configured to cover front and rear outer sides of the second battery module,
wherein the first bent portions of the first cover frame includes:
a first open part opened such that an electric bus bar configured to electrically connect the first battery module to electrical components is exposed to the outside; and
a first opening opened such that a part of a module bus bar configured to electrically connect the first battery module and the second battery module is exposed to the outside, and wherein the second bent portions of the second cover frame includes:
a second open part opened such that an electric bus bar configured to electrically connect the second battery module to electrical components is exposed to the outside; and
a second opening opened such that a part of the module bus bar configured to electrically connect the first battery module and the second battery module is exposed to the outside.

2. The battery pack according to claim 1, further comprising electrical components configured to detect and measure current of the first battery module and the second battery module or to control a flow of the current, the electrical components being mounted to outer sides of the first bent portion and the second bent portion.

3. The battery pack according to claim 1, wherein the cover structure includes a reinforcing member coupled to an outer side of each of the first bent portion and the second bent portion.

4. The battery pack according to claim 1, wherein each of the first battery module and the second battery module further includes:
a module housing having a plurality of hollows therein such that the plurality of battery cells are accommodated therein; and
a connection plate including a connection portion having a third plate shape with relatively wider upper and lower surfaces than side surfaces, located at an upper or lower portion thereof at which electrode terminals of the plurality of battery cells are disposed, and having a plurality of connection terminals to be in electric contact and connection with the electrode terminals of the battery cells, and an extending portion configured to protrusively extend from both left and right ends of the connection portion so that a part of the extending portion is bent upward or downward from the connection portion and an end of the extending portion is in contact and connection with a portion of another connection plate.

5. The battery pack according to claim 4, wherein the connection plate has a first connection plate and a second connection plate,
wherein the extending portion of the second connection plate is in electrical contact with the extending portion of the first connection plate, and
wherein the extending portion of each of the first connection plate and the second connection plate has an expanding structure diagonally extending in a front or rear direction.

6. The battery pack according to claim 4, wherein each of the first cover frame and the second cover frame has a ridged structure configured to face a portion of the module housing.

7. The battery pack according to claim 4, wherein the cover structure further includes:
an upper plate configured to cover upper portions of the first cover frame and the second cover frame; and
a lower plate configured to support lower portions of the first cover frame and the second cover frame upward,
the module housing has a fixing tube perforated vertically from an upper portion to a lower portion thereof, and
the upper plate and the lower plate include a fixing member having a protrusively extending shape so as to be partially inserted into the fixing tube of the module housing.

8. The battery pack according to claim 2, wherein each of the first battery module and the second battery module further includes at least one thermal conductive member at an upper portion thereof, at a lower portion thereof, or at both upper and lower portions thereof,
wherein a barrier is provided to protrusively extend upward from an upper surface of the module housing, and
wherein the thermal conductive member is disposed to be in contact with a portion of the barrier.

9. The battery pack according to claim 8, wherein a rib extends in a front and rear direction from an end of the barrier of each of the first battery module and the second battery module, and
wherein the battery pack further comprises a fixture configured to be coupled to the rib of each of the first battery module and the second battery module.

10. An electronic device, comprising the battery pack according to claim 1.

11. A vehicle, comprising the battery pack according to claim 1.

12. A battery pack, comprising:
a cover structure including:
a first cover frame having a first body portion of a first plate shape and first bent portions bent leftward at both front and rear ends of the first body portion to form a first inner space, and
a second cover frame having a second body portion of a second plate shape coupled to the first portion, and having second bent portions bent rightward at both front and rear ends of the second body portion to form a second inner space;
a first battery module accommodated in the first inner space and having a plurality of battery cells; and
a second battery module accommodated in the second inner space and having a plurality of battery cells,
wherein each of the first battery module and the second battery module further includes:
a module housing having a plurality of hollows therein such that the plurality of battery cells are accommodated therein; and
a connection plate including a connection portion having a third plate shape with relatively wider upper and lower surfaces than side surfaces, located at an upper or lower portion thereof at which electrode terminals of the plurality of battery cells are disposed, and having a plurality of connection terminals to be in electric contact and connection with the electrode terminals of the battery cells, and an extending portion configured to protrusively extend from both left and right ends of the connection portion so that a part of the extending portion is bent upward or downward from the connection portion and an end of the extending portion is in contact and connection with a portion of another connection plate.

13. The battery pack according to claim 12, wherein the connection plate has a first connection plate and a second connection plate,
wherein the extending portion of the second connection plate is in electrical contact with the extending portion of the first connection plate, and
wherein the extending portion of each of the first connection plate and the second connection plate has an expanding structure diagonally extending in a front or rear direction.

14. The battery pack according to claim 12, wherein each of the first cover frame and the second cover frame has a ridged structure configured to face a portion of the module housing.

15. The battery pack according to claim 12, wherein the cover structure further includes:
- an upper plate configured to cover upper portions of the first cover frame and the second cover frame; and
- a lower plate configured to support lower portions of the first cover frame and the second cover frame upward,
- the module housing has a fixing tube perforated vertically from an upper portion to a lower portion thereof, and
- the upper plate and the lower plate include a fixing member having a protrusively extending shape so as to be partially inserted into the fixing tube of the module housing.

16. The battery pack according to claim 12, wherein each of the first battery module and the second battery module further includes at least one thermal conductive member at an upper portion thereof, at a lower portion thereof, or at both upper and lower portions thereof,
- wherein a barrier is provided to protrusively extend upward from an upper surface of the module housing, and
- wherein the thermal conductive member is disposed to be in contact with a portion of the barrier.

17. The battery pack according to claim 16, wherein a rib extends in a front and rear direction from an end of the barrier of each of the first battery module and the second battery module, and
- wherein the battery pack further comprises a fixture configured to be coupled to the rib of each of the first battery module and the second battery module.

* * * * *